Dec. 10, 1935.  C. A. K. CORNWALL  2,023,758

WHEEL LOCK AND EASY STARTING DEVICE FOR VEHICLES

Filed Aug. 14, 1934

INVENTOR.
CLEMENT ARTHUR K. CORNWALL.
PER.
ATTORNEY.

Patented Dec. 10, 1935

2,023,758

UNITED STATES PATENT OFFICE 2,023,758

WHEEL LOCK AND EASY STARTING DEVICE FOR VEHICLES

Clement Arthur K. Cornwall, Victoria, British Columbia, Canada

Application August 14, 1934, Serial No. 739,776

2 Claims. (Cl. 185—41)

My invention relates to improvements in a vehicle wheel-lock and easy starting device in which a friction band on a main drive-shaft mounted one way clutch imparts the torsional energy produced by a vehicle at rest on a grade to a spring, said spring stored energy being then available to aid in restarting the vehicle up the grade when power is applied; and a control from the gear-shift lever to make the friction band non-operative upon gears being put in reverse when it is desired to back down the grade; and the objects of my invention are, first, to provide an automatic wheel lock to prevent the vehicle from moving backward out of control on a grade; second, to supply spring stored energy for an easy start when power is applied to continue up the grade; third, to make the device non-operative when the gear shift lever is put in reverse to back the vehicle; fourth, to make the device capable of operation as a wheel lock in the event of the energy storing spring failing; fifth, to make it unnecessary to use the brakes when starting from rest up a grade; sixth, to eliminate excessive clutch wear and starting strains when starting on a grade; and, seventh, to provide safe parking on an upgrade without depending on the brakes.

I attain these objects by the mechanism illustrated in the accompanying drawing, in which:—

Figure 1:
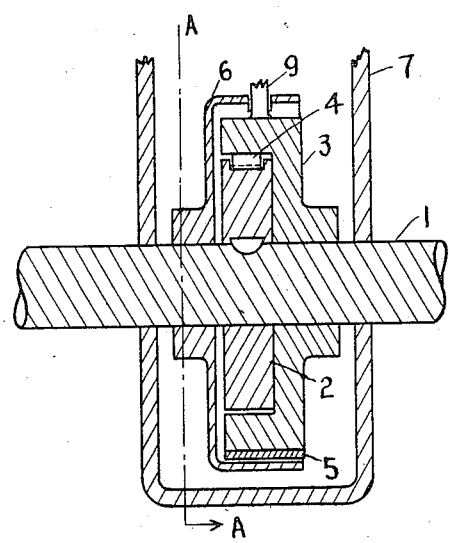
Figure 3:
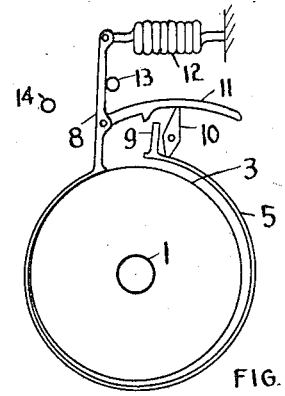
Figure 4:
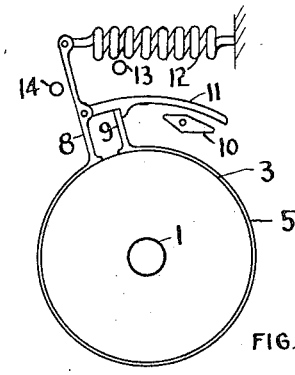
Figure 2:
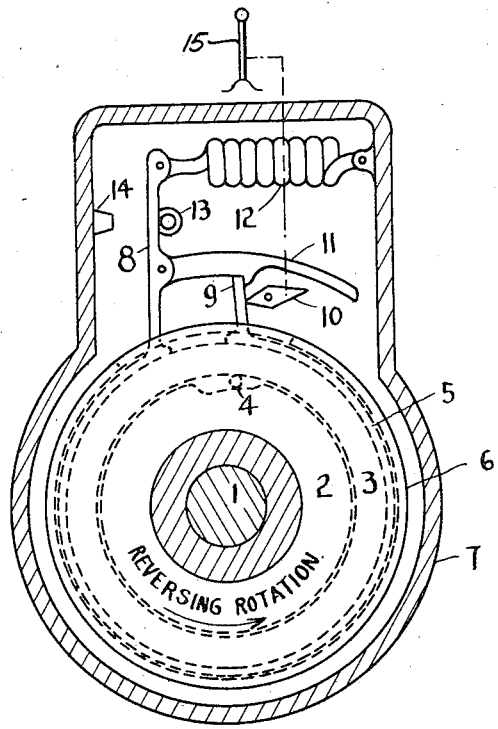

Fig. 1 is a vertical longitudinal section view of the device with the spring and control levers omitted; Fig. 2 an end view section on line A—A of Fig. 1 with the friction band and its controls in normal forward running position with the gear shift in any forward or in neutral position; Fig. 3 an end view showing the position of the friction band and controls in normal backing position with gear shift in reverse; Fig. 4 an end view showing normal runback into lock, gear shift in any forward or neutral position; and Fig. 5 an end view showing friction band released under load by moving gear shift into reverse, allowing vehicle to be backed down hill after device has been in operation.

Similar numerals refer to similar parts throughout the several views.

The main central drive shaft of a vehicle is represented by 1, and 2 is a collar keyed to the drive shaft and having tapered slots in its perimeter in which rollers 4 operate to form a one way clutch to engage with the inner surface of the flange of the flanged disc 3 which is free to rotate on the shaft 1. The friction band 5 has extended controlling arms 8 and 9 and is retained in position by the flanged disc 6 centrally bored to allow the drive shaft 1 to freely rotate.

In a normal forward running of the vehicle the one way clutch formed by parts 2, 3 and 4 is disengaged and the clutch non-operative. Should the vehicle stall on a grade the main shaft starts to rotate in a reverse direction, the one way clutch acts and the torsional energy is transmitted by the friction band 5 and arm 8 to the spring 12. The spring extends as shown in Fig. 4 and the energy now stored in the spring balances the gravitational pull on the vehicle and is available to aid in starting the progress of the vehicle up the hill when power is applied to the drive shaft. The stops 13 and 14 limit the travel of the spring and are part of the casing 7 which casing is adapted to be attached to a stationary part of the vehicle. If the spring fails the stop 14 holds the arm 8 and the device continues to act as a wheel lock.

Figure 5:
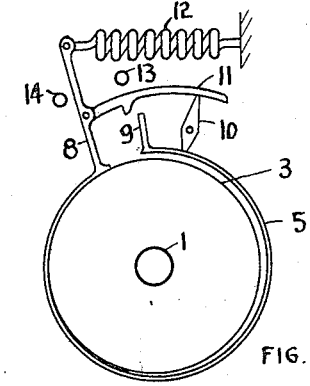

When the gear shift lever indicated at 15 in Fig. 2 is placed in reverse it acts on the cam 10 as shown in Figs. 3 and 5 causing the ratchet 11 to swing out of engagement with the arm or pawl 9, releasing the grip of the friction band 5 on the driven element of the one way clutch and the vehicle can be backed under power.

I claim:

1. In a vehicle wheel-lock and easy starting device for vehicles, the combination with the drive shaft thereof of an automatic one way clutch, a friction member to engage with the driven element of the said automatic one way clutch, and the gear shift lever of the vehicle and controlling means between said gear shift lever and said friction member, a resilient member anchored to said vehicle, and means whereby the torsional energy imparted to said friction member is transmitted to and stored in said resilient member.

2. In a vehicle wheel-lock and easy starting device, the combination of a peripheral taper slotted collar keyed to the main drive shaft of the vehicle and a flanged disc revolvable with said drive shaft and adapted to lock in one direction of rotation by means of rollers in said tapered slots with said collar. A flexible friction band with substantially radial arms controlled by a ratchet catch and a gear shift lever operated cam to engage said flexible friction band with said flanged disc, a slotted flanged disc centrally bored to allow free rotation of said drive shaft and adapted to retain said friction band in position, and a spring connected at one end to one of said arms and at the other end to a stationary part of the vehicle, and stops to limit the motion of said spring connected arm, all substantially as set forth.

CLEMENT ARTHUR K. CORNWALL.